(12) United States Patent
Vizer et al.

(10) Patent No.: US 10,592,308 B2
(45) Date of Patent: Mar. 17, 2020

(54) AGGREGATION BASED EVENT IDENTIFICATION

(71) Applicant: ENTIT Software LLC, Sunnyvale, CA (US)

(72) Inventors: Fernando Vizer, Yehud (IL); Noam Fraenkel, Yehud (IL); Yair Horovitz, Yehud (IL)

(73) Assignee: MICRO FOCUS LLC, Santa Clara, CA (US)

(\*) Notice: Subject to any disclaimer, the term of this patent is extended or adjusted under 35 U.S.C. 154(b) by 0 days.

(21) Appl. No.: 15/569,206

(22) PCT Filed: Apr. 30, 2015

(86) PCT No.: PCT/US2015/028587
§ 371 (c)(1),
(2) Date: Oct. 25, 2017

(87) PCT Pub. No.: WO2016/175845
PCT Pub. Date: Nov. 3, 2016

(65) Prior Publication Data
US 2018/0107528 A1     Apr. 19, 2018

(51) Int. Cl.
*G06F 9/54* (2006.01)
*G06F 16/28* (2019.01)
(Continued)

(52) U.S. Cl.
CPC .......... *G06F 9/542* (2013.01); *G06F 11/0709* (2013.01); *G06F 11/0781* (2013.01);
(Continued)

(58) Field of Classification Search
CPC ..................................................... G06F 9/542

USPC ......................................................... 719/318
See application file for complete search history.

(56) References Cited

U.S. PATENT DOCUMENTS 7,506,195 B2 * 3/2009 Takahashi ........... G06F 11/0709
707/999.202
8,209,567 B2   6/2012 Cohen et al.
(Continued)

FOREIGN PATENT DOCUMENTS

CN          103164511         6/2013

OTHER PUBLICATIONS

Becker, et al, Learning Similarity Metrics tor Event identification in Social Media, Proceedings of the Third ACM International Conference on web Search and Data Mining, Feb. 4-6, 2010, pp. 291-300.
(Continued)

*Primary Examiner* — Andy Ho

(57) ABSTRACT

According to an example, aggregation based event identification may include aggregating each of a plurality of source events by an event type of event types that represent dusters of the source events and/or a host of a source event of the source events to generate a reduced number of the source events. Aggregation based event identification may further include analyzing a characteristic for each of the reduced number of the source events, and assigning, based on the analysis of the characteristic for each of the reduced number of the source events, a characteristic weight to each of the reduced number of the source events. Further, aggregation based event identification may include aggregating the characteristic weights for each of the reduced number of the source events to determine an aggregated event issue weight for each of the reduced number of the source events.

19 Claims, 19 Drawing Sheets

(51) Int. Cl.
*G06F 11/34* (2006.01)
*G06F 17/40* (2006.01)
*G06F 11/30* (2006.01)
*G06F 11/07* (2006.01)
*G06F 11/32* (2006.01)

(52) U.S. Cl.
CPC ...... *G06F 11/3082* (2013.01); *G06F 11/3452* (2013.01); *G06F 16/287* (2019.01); *G06F 17/40* (2013.01); *G06F 11/079* (2013.01); *G06F 11/324* (2013.01); *G06F 2201/86* (2013.01)

(56) References Cited

U.S. PATENT DOCUMENTS

| | | | |
|---|---|---|---|
| 8,924,493 | B1 | 12/2014 | Yeskel et al. |
| 9,183,033 | B2 * | 11/2015 | Wang ................. G06F 9/45558 |
| 2006/0095570 | A1 | 5/2006 | O'Sullivan |
| 2011/0029990 | A1 | 2/2011 | Aaronson |
| 2012/0066694 | A1 | 3/2012 | Jennings et al. |
| 2013/0222133 | A1 | 8/2013 | Schultz et al. |
| 2014/0006871 | A1 | 1/2014 | Lakshmanan et al. |
| 2014/0109111 | A1 | 4/2014 | Gupta et al. |

OTHER PUBLICATIONS

International Searching Authority, International Search Report and Written Opinion, dated Feb. 1, 2016, 9 pages.

ManageEngine / EventLog Analyzer Powering IT ahead; Unlock The Real Value Of Your Machine Generated Logs, Apr. 28, 2014, 2 pages http://www.manageengine.com/products/eventlog/reseller_docs/eventlog-analyzer-flyer.pdf.

* cited by examiner

FIG. 5

Most significant messages(20) Events · Ignored Message Groups (0)

| Time | Severity<br>All Selected | Message Text<br>Start typing to filter messages | Occurrences | Host Name |
|---|---|---|---|---|
| 08/15/2014<br>12:47:00 ← 502 | Very-High | UXMON: Resource groups are NOT RUNNING AT ALL in PSTRC_OPADAP ( reuxeuux170 reuxeuux171 ) | 12 | reuxeuux170.<br>bp.com |
| 08/15/2014<br>12:48:00 | Very-High | Failure: System bp1afadc001. bp1. ad. bp. com is possibly down! System cannot be pinged from 0v0 server. | 4742 | bp1afadc001.bp<br>1.ad.bp.com |
| 08/15/2014<br>12:49:00 | Very-High | Cluster resource 'SQL Server ( INTRANET_PROD )' of type 'SQL Server' in clustered role 'SQL Server ( INTRANET_PROD )' failed. Based on the fai... | 2 | kaedensa201.<br>3748.1468.ec<br>s.hp.com |
| 08/15/2014<br>12:50:00 | Very-High | MULTIPLE ; COPY_AUFWP_WinFS_Daily ;Aborted;2014/08/ 15- 169 ; Copy ;NULL;Issue in last 7 ;restartable=C (Check backup documentation)... | 6 | augdcdpi01.m<br>yintranet.local |
| 08/15/2014<br>12:53:00 | Very-High | DBSPI-0001.3: DB-SPI cannot connect to database DBREMSA2 , may be down; Oracle error [ ORA-28001 : the password has expired ]. [Polic... | 36 | remsrarc2.ktzh<br>.railways.local |
| 08/15/2014<br>12:59:00 | Very-High | WPSLPRD2 :ERRORLOG: ORA- 1652 : unable to extend temp segment by 128 in tablespace TEMP2 | 66 | cgreofdb04prd.ca<br>non.trce.hp.com |
| | | Lines per page: 100 ✓ | Messages 1 – 20 out of 20 |« ‹ [1] › »|

↑ 500

Message Text

WPSLPRD2 :ERRORLOG: ORA- 1652 : unable to extend temp segment by 128 in tablespace TEMP2
↑ 504

Parameter Distribution -- 32 Occurrences

| PROD | 3.1% | SJETMCC4 | 3.1% |
| SJETMCC3 | 9.4% | PDMT | 3.1% |
| SJETMCC1 | 9.4% | OTMMPRD_2 | 56.3% |
| PEVRIDA | 6.3% | ALD | 3.1% |
| WPSLPRD2 | 6.3% | | |

↘ 506

| Time | Severity | Message Text | Occurr ences | Group ID | Group Actions ☐Liked only | |
|---|---|---|---|---|---|---|
| | None Selected | Start typing to filter messages | | | | |
| 08/15/2014 04:00:00 | Very-High ⁄ | FREE DISK SPACE ON 'K: SapData LOWER THAN THRESHOLD 5 . 0% ( 8191 . 80 MB) | 6911 | 11065 | 🗄 | ⊙ |
| 08/15/2014 05:51:00 | Very-High ⁄ | FREE DISK SPACE ON E:\ SG10DB' SG10DB LOWER THAN THRESHOLD 10 . 0% ( 31743 . 79 MB) | 6911 | 11065 | 🗄 | ⊙ |
| 08/15/2014 07:34:00 | Very-High ⁄ | SCOPEP :ERRORLOG: ORA-07445: exception encountered: core dump [slaac_int()+237] [unknown signal] [ADDR: 0xD03 ] [PC: 0x242F793] [unkown c... | 5 | 12366 | 🗄 | ⊙ |
| 08/15/2014 07:34:00 | Very-High ⁄ | SCOPEP :ERRORLOG: ORA-07445: exception encountered: core dump [ slaac_int() +237] [SIGXCPU ] [ADDR: 0x7FFF6FAC41E0] [PC: 0x242F793 ] [unk... | 6 | 12433 | 🗄 | ⊙ |
| 08/15/2014 07:36:00 | Very-High ⁄ | SCOPEP :ERRORLOG: ORA-07445: exception encountered: core dump [slaac_int()+237] [unknown signal] [ADDR: 0x7F00658E7E79] [PC: 0x242F793] [... | 5 | 12366 | 🗄 | ⊙ |
| 08/15/2014 12:15:00 | Very-High ⁄ | SOSRIN2 :ERRORLOG: ORA-07445: exception encountered: core dump [slaac_int()+237] [unknown signal] [ADDR: 0x7FFF624380D8] [PC: 0x2CA144B ... | 5 | 12366 | 🗄 | ⊙ |
| 08/15/2014 12:15:00 | Very-High ⁄ | SOSRIN2 :ERRORLOG: ORA-07445: exception encountered: core dump [ MsgCheckLEBOM ()] ( unknown signal ) [ADDR: 0x0] [PC: 0x2AB0F0A0F480 ] [... | 6 | 12433 | 🗄 | ⊙ |
| 08/15/2014 12:16:00 | Very-High ⁄ | APPIQ:ERRORLOGL ORA-07445: exception encountered: core dump [PC:0x209F40B1] [ACCESS_VIOLATION] [ADDR:0x20A8C000] [PC: 0x209F40B1] [UNABLE_TO... | 1 | 11948 | 🗄 | ⊙ |

600

Lines per page: 100  Messages 1 – 20 out of 20  « ‹ 1 › »

FIG. 6

⟨ Dashboard

Most significant messages (20) | Events | Ignored Message Groups (0)

706

6 Columns ⌄

| Time | Severity<br>None Selected ⌄ | Message Text<br>Start typing to filter messages | Occurrences | Group ID | Group Actions ☐Liked only |
|------|---|---|---|---|---|
| 08/15/2014 12:16:00 | Very-High | APPIQ:ERRORLOG: ORA-07445: exception encountered: core dump [PC:0x209F40B1] [ACCESS_VIOLATION] [ADDR:0x20A8C000] [PC:0x209F40B1] [UNABLE_TO... | 1 | 11948 | 👍 🛈 |
| 08/15/2014 13:05:00 | Very-High | PROD ;ERRORLOG: ORA-07445: exception encountered: core dump [snstimsane () +51] [SIGEGV] [ADDR: 0x0 ] [PC: 0xEDB15CB ] [Address not mappe... | 8 | 10977 | 👍 🛈 |
| 08/15/2014 13:43:00 | Very-High | PEVRAUR ;ERRORLOG: ORA-07445: exception encountered: core dump [ kopfqncset () +4] [SIGSEGV] [ADDR: 0x5 ] [PC: 0x2D1CF14 ] [Address not mapp... | 8 | 10977 | 👍 🛈 |
| 08/15/2014 16:23:00 | Very-High | Process Microsoft.Exchange.infoWorker.Common.Delayed 1[System.String] : Marguerite K>SMTP : MEG . Rapplean @onprem.abbvie.com failed in a... | 4 | 11277 | 👍 🛈 |
| 08/15/2014 16:23:00 | Very-High | DBSPI-0001.3: DB-SPI cannot connect to database DBREMSA3 , may be down; Oracle error [ ORA-28001 : the password has expired ]. Policy:DBMON... | 36 | 11216 | 👍 🛈 |
| 08/15/2014 16:27:00 | Very-High | PROD ;ERRORLOG: ORA- 1652 : unable to extend temp segment by 128 in tablespace TEMP01 | 66 | 11139 | 👍 🛈 |
| 08/15/2014 19:52:00 | Very-High | SSOMMCC4 ;ERRORLOG: ORA-07445: exception encountered: core dump [ ph2csql analyze () +3192 ] [SIGSEGV] [ADDR: 0x0 ] [PC: 0x38609EE ] [Addres... | 2 | 10977 | 👍 🛈 |
| 08/15/2014 20:47:00 | Very-High | CLUSTER RESOURCE DHCP IP ADDRESS OF GROUP DHCP SERVICE GROUP IS NOT ONLINE! | 8 | 14281 | 👍 🛈 |
| 08/15/2014 22:02:00 | Very-High | SCellNameTimeDate ESMEVAMCC2 : SWCID 9 : Ecode: 201 : CAC 81 : EIP 5 , | 531 | 11018 | 👍 🛈 |

Lines per page: 100⌄   Messages 1–20 out of 20   ⟪ ⟨ [1] ⟩ ⟫

| Event Number | Event Text |
|---|---|
| 1 | 2015-04-11 22:00:10 ERROR SYSCOPE5 LUXOR07 The server was unresponsive during 12.37 seconds |
| 2 | 2015-04-11 22:00:31 ERROR SYSCOPE5 LUXOR07 The server was unresponsive during 20.34 seconds |
| 3 | 2015-04-11 22:01:30 ERROR SYSCOPE5 LUXOR07 The server was unresponsive during 51.35 seconds |
| 4 | 2015-04-11 22:01:36 WARNING IBRIX08 SYSCOPE2 Files system /opt/DBX is almost full. 85 % free |
| 5 | 2015-04-11 22:02:50 ERROR SYSCOPE5 LUXOR07 The server was unresponsive during 42.33 seconds |
| 6 | 2015-04-11 22:02:32 ERROR SYSCOPE5 LUXOR02 The server was unresponsive during 17.31 seconds |
| 7 | 2015-04-11 22:02:47 ERROR SYSCOPE1 PAL07 The server was unresponsive during 172.34 seconds |
| 8 | 2015-04-11 22:06:31 WARNING IBRIX08 SYSCOPE2 Files system /opt/DBX is almost full. 87 % free |
| 9 | 2015-04-11 22:07:12 WARNING IBRIX08 PAL07 Files system /opt/DBX is almost full. 85 % free |
| 10 | 2015-04-11 22:07:19 ERROR BPM99 PAL07 The transact GG 643745 can't be completed DB7 failure |
| 11 | 2015-04-11 22:08:43 ERROR BPM99 BILL78 The transact GG 643746 can't be completed DB7 failure |
| 12 | 2015-04-11 22:09:12 ERROR BPM99 BILL78 The transact GG 643747 can't be completed DB7 failure |

List-1

FIG. 8A

| Field Name | Date | Error Level | Source | Host | Message |
|---|---|---|---|---|---|
| Example | 2015-04-11 22:08:43 | ERROR | BPM99 | BILL78 | The transact GG 643746 can't be completed DB7 failure |

List-2

FIG. 8B

| Event Type | Event Text |
|---|---|
| I | The transact GG 643747 can't be completed DB7 failure |
| II | Files system /opt/ DBX is almost full. 85 % free |
| III | The server was unresponsive during 51.35 seconds |

List-3

FIG. 8C

| Table Name | Contains | Relationship |
|---|---|---|
| arcsigh_log_strean | Event data but not the message, including cluster_id | Many to one to table la_unique_msg |
| la_unique_msg | The message filed and pointer to cluster_id | Many to one to table la_cluster_msg |
| la_cluster_msg | Representative message of a certain cluster, and the word index for parameters discovered in the message on the given type | |

List-4

FIG. 8D

| Bucket | Event | Types | Events After Reducing | Detailed Explanation |
|---|---|---|---|---|
| 1 | 1 | III | 101 | Events 1, 2, 3 and 5 come from the host, and are the same type |
|  | 2 |  |  |  |
|  | 3 |  |  |  |
|  | 4 | II | 102 | Event 4 belongs to a unique type in the bucket |
|  | 5 | III | 101 | Events 1, 2, 3 and 5 come from the host, and are the same type |
|  | 6 |  | 103 | Event 6 belongs to the same type as 1, 2, 3 and 5, but belongs to a different host |
|  | 7 |  | 104 | Event 7 belongs to the same type as 1, 2, 3 and 5, but belongs to a different host and source |
| 2 | 8 | II | 105 | Event 8 belongs to the same type as event 9, but from a different host |
|  | 9 |  | 106 | Event 9 belongs to the same type as event 8, but from a different host |
|  | 10 | I | 107 | Same type as event 11 and 12, but different server |
|  | 11 |  | 108 | Same type as event 10 but different server |
|  | 12 |  |  |  |

List-5

FIG. 8E

| Event Evaluator | Description | Weight |
|---|---|---|
| Severity | Use normalized severity of event to match to a unique list: Very-High, High, Medium, Low, and unknown | Each severity level has its own coefficient |
| Keyword | Search from a list of specific keywords or expressions in each event message text | Each word or expression has its own coefficient for weighting |
| SME | An event type may be marked as relevant event or may be marked as a not-relevant event | Positive feedback will increase the relevance of the event, and negative will decrease. |
| Anomaly | An anomaly in the behavior in time of the frequency may point to the occurrence of a potential issue | If a certain type of event from a specific host suddenly augments its frequency, or is new, or is very rare, it will have a different weight coefficient. |

List-6

FIG. 8F

| Event Number | Event Text |
|---|---|
| 1 | 2015-04-11 22:00:10 ERROR SYSCOPE5 LUXOR07 The server was unresponsive during 12.37 seconds |
| 2 | 2015-04-11 22:00:31 ERROR SYSCOPE5 LUXOR07 The server was unresponsive during 20.34 seconds |
| 3 | 2015-04-11 22:01:30 ERROR SYSCOPE5 LUXOR07 The server was unresponsive during 51.35 seconds |
| 4 | 2015-04-11 22:01:36 WARNING IBRIX08 SYSCOPE2 Files system /opt/vertica is almost full. 85 % free |
| 5 | 2015-04-11 22:02:50 ERROR SYSCOPE5 LUXOR07 The server was unresponsive during 42.33 seconds |
| 6 | 2015-04-11 22:00:52 ERROR SYSCOPE5 LUXOR07 The server was unresponsive during 17.31 seconds |
| 7 | 2015-04-11 22:02:47 ERROR SYSCOPE1 PAL07 The server was unresponsive during 172.34 seconds |
| 8 | 2015-04-11 22:06:31 WARNING IBRIX08 SYSCOPE2 Files system /opt/vertica is almost full. 87 % free |
| 9 | 2015-04-11 22:07:12 WARNING IBRIX08 PAL07 Files system /opt/vertica is almost full. 85 % free |
| 10 | 2015-04-11 22:07:19 ERROR BPX69 PAL07 The transact GG 649746 can't be completed DB7 failure |
| 11 | 2015-04-11 22:07:43 ERROR BPX69 BILL76 The transact GG 649746 can't be completed DB7 failure |
| 12 | 2015-04-11 22:08:12 ERROR BPX69 BILL76 The transact GG 649747 can't be completed DB7 failure |

List-8

FIG. 8H

| Aggregated Event | Severity Weight | Keyword Weight | Baseline Weight | SME Weight | Aggregated Event Issue Weight |
|---|---|---|---|---|---|
| 1113 | 100 | 50 | *1000* | 60 | *1210* |
| 1114 | 100 | 50 | 0 | 0 | 150 |
| 1115 | 100 | 50 | 0 | 0 | 150 |
| 1116 | 100 | 50 | 0 | 0 | 150 |
| 1117 | 100 | 50 | 0 | 0 | 150 |

List-9

```
AGGREGATE EACH OF A PLURALITY OF SOURCE EVENTS BY AN
EVENT TYPE OF EVENT TYPES THAT REPRESENT CLUSTERS OF THE
SOURCE EVENTS AND/OR A HOST OF A SOURCE EVENT OF THE
SOURCE EVENTS TO GENERATE A REDUCED NUMBER OF THE
SOURCE EVENTS
902
```

```
ANALYZE, A CHARACTERISTIC FOR EACH OF THE REDUCED NUMBER
OF THE SOURCE EVENTS
904
```

```
ASSIGN, BASED ON THE ANALYSIS OF THE CHARACTERISTIC FOR
EACH OF THE REDUCED NUMBER OF THE SOURCE EVENTS, A
CHARACTERISTIC WEIGHT TO EACH OF THE REDUCED NUMBER OF
THE SOURCE EVENTS
906
```

```
AGGREGATE THE CHARACTERISTIC WEIGHTS FOR EACH OF THE
REDUCED NUMBER OF THE SOURCE EVENTS TO DETERMINE AN
AGGREGATED EVENT ISSUE WEIGHT FOR EACH OF THE REDUCED
NUMBER OF THE SOURCE EVENTS
908
```

FIG. 9

AGGREGATION BASED EVENT IDENTIFICATION

BACKGROUND

Event processing may include tracking and analyzing streams of information to determine the occurrence of an event. An event may be described as any occurrence of relevance to a particular area (e.g., a field, technology, etc.). Once an event is detected, a conclusion may be drawn from the occurrence of the event, and further actions may be taken with respect to the event.

BRIEF DESCRIPTION OF DRAWINGS

Features of the present disclosure are illustrated by way of example and not limited in the following figure(s), in which like numerals indicate like elements, in which:

FIG. 5 illustrates event distribution over time related to the aggregation based event identification apparatus, according to an example of the present disclosure;

FIGS. 8A-8I illustrate an application of the aggregation based event identification apparatus, according to an example of the present disclosure;

FIG. 9 illustrates a method for aggregation based event identification, according to an example of the present disclosure;

DETAILED DESCRIPTION

Figure 1:
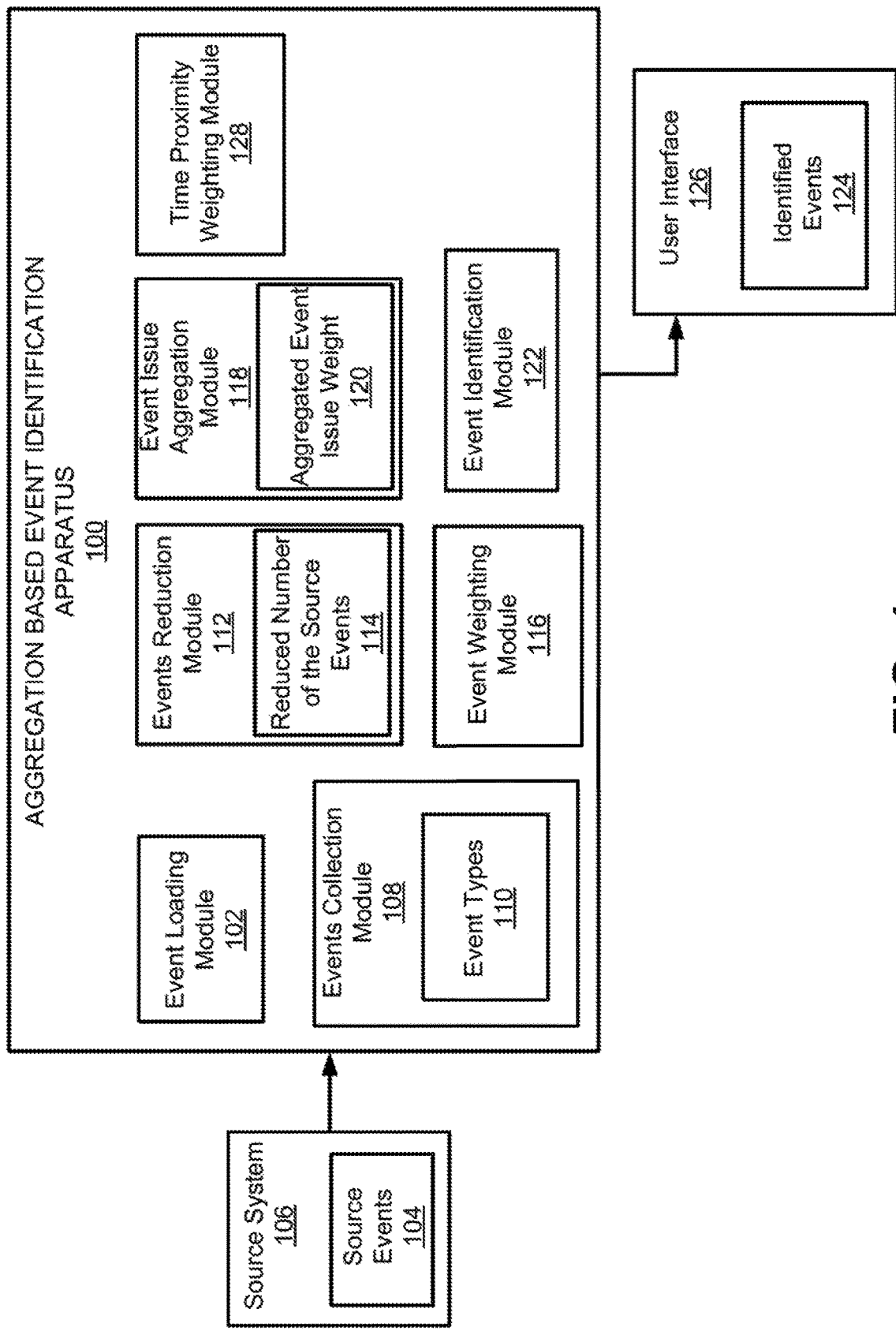
FIG. 1 illustrates an architecture of an aggregation based event identification apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, and the term "including" means including but not limited to. The term "based on" means based at least in part on.

With respect to event detection and management, one technique of event detection and management may include deployment of agents (or other systems) on information technology (IT) assets (e.g., servers, routers, etc.) to monitor the environment of the IT assets, and generate events whenever a threshold is breached or another trigger is identified. Such events may be collected, for example, via mid-level processors, and forwarded to an operational console where they may be viewed by IT operators that need to prioritize them, identify related issues, and either resolve the issues or escalate the issues to higher level tiers.

An aspect associated with such environments includes accounting for an overflow of events. For example, too many events that occur in the normal operation of IT systems may cause a constant "noise" in an event detection system, which may add challenges with respect to separation of events that indicate real issues that should be addressed, from the events that do not need attention. This may lead to a case of "constant red" when events are ignored or suppressed because there are too many events to address, and a majority of the events are benign (i.e., not relevant, or of minimal relevance to the operation of an associated system).

In order to address the aforementioned aspects related to event detection and management, according to examples, an aggregation based event identification apparatus and a method for aggregation based event identification are disclosed herein. For the apparatus and method disclosed herein, machine learning and other techniques as disclosed herein may be used to ascertain unique events that exist in an associated system. For example, an events collection module may receive a plurality of events (e.g., an event stream of source events from a source system), and ascertain unique events (i.e., event types as described herein) from the plurality of received events by clustering. Each event type may represent a cluster of events of a same (or similar) type. Thus, an event type may represent a plurality of same (or similar) events in the event stream. The event types may be aggregated to generate a reduced number of the source events. An event weighting module may analyze, for each of the reduced number of the source events, a priority characteristic (e.g., based on severity or known keywords), an abnormal behavior characteristic (e.g., based on deviation from a normal distribution), and/or a tagged characteristic (e.g., based on tagging by subject matter expert (SME) input with respect to relevant events or event types in earlier cases). The event weighting module may assign, based on the analysis for each of the reduced number of the source events, a priority characteristic weight, an abnormal behavior characteristic weight, and/or a tagged characteristic weight to each of the reduced number of the source events.

The apparatus and method disclosed herein may thus identify events that are relevant, while minimizing the identification of benign events. The apparatus and method disclosed herein may also facilitate the management of event overflow, for example, by providing for the identification and management of relevant events. By comparing similar events, but with different parameters, the apparatus and method disclosed herein may provide for the analysis of historical behavior, and identification of faulty components.

FIG. 1 illustrates an architecture of an aggregation based event identification apparatus (hereinafter also referred to as "apparatus 100"), according to an example of the present disclosure. Referring to FIG. 1, the apparatus 100 is depicted as including an event loading module 102 to receive (or otherwise ascertain) a plurality of source events 104, for example, from a source system 106.

An events collection module 108 may generate clusters from the plurality of source events 104. Each cluster of the clusters may represent an event type of a plurality of event types 110.

An events reduction module 112 may aggregate each of the plurality of source events 104 by the event type of the event types 110 and a host of a source event of the plurality of source events 104 (or a different variable) to generate a reduced number of the source events 114.

An event weighting module 116 may analyze, for each of the reduced number of the source events 114, a priority characteristic, an abnormal behavior characteristic, and/or a tagged characteristic. The event weighting module 116 may assign, based on the analysis for each of the reduced number of the source events 114, a priority characteristic weight, an abnormal behavior characteristic weight, and/or a tagged characteristic weight to each of the reduced number of the source events 114.

An event issue aggregation module 118 may aggregate one of the weights (if one of the priority characteristic, abnormal behavior characteristic, and tagged characteristic is analyzed) or each of the weights (if two or more of the priority characteristic, abnormal behavior characteristic, and tagged characteristic are analyzed) for each of the reduced number of the source events 114 to determine an aggregated event issue weight 120 for each of the reduced number of the source events 114.

A event identification module 122 may determine whether the aggregated event issue weight 120 for each of the reduced number of the source events 114 exceeds an aggregated event issue weight threshold. Further, in response to a determination that the aggregated event issue weight 120 for each of the reduced number of the source events 114 exceeds the aggregated event issue weight threshold, the event identification module 122 may identify an associated one of the reduced number of the source events 114 for which the aggregated event issue weight 120 exceeds the aggregated event issue weight threshold as an event of interest of a plurality of identified events 124 that may be identified. The plurality of identified events 124 may be displayed by using a user interface 126 as described herein with reference to FIG. 3.

A time proximity weighting module 128 may receive an indication of a time related to a different event of interest (from the event of interest), and identify events of interest that are a cause of the different event of interest. Further, the time proximity may be adjusted, such that events closer to a specified time are move up (e.g., by weighting as more relevant), and those far from the specified time are weighted as less relevant.

Referring to FIG. 1, as described herein, the event loading module 102 may receive a stream of source events 104 from a source system 106. The events collection module 108 may process the source events 104 to identify events that match a same or similar structure (i.e., pattern). In this regard, the events collection module 108 may parse the source events 104, and process the parsed source events 104 to identify events that match a same or similar pattern. According to an example, the events collection module 108 may cluster events into clusters of event types 110 by applying a reverse engineering technique, and determining the event types 110 from the stream of the source events 104.

An event type may be determined based on a pattern and a parameter related to an event. For each event of the source events 104, the events collection module 108 may assign an event type (e.g., a cluster identification (ID)) which captures the pattern of the event and parameters related to the event. The pattern of an event may be described as a component of the event that is common to all events of the same type. For example, patterns may include language of an event that is common to all events of the same type as described herein with reference to FIG. 8. A parameter of an event may be described as information that fits into an event message, where parameters may include values that potentially change between individual instances of events of the same type as described herein with reference to FIG. 8C.

Figure 2:
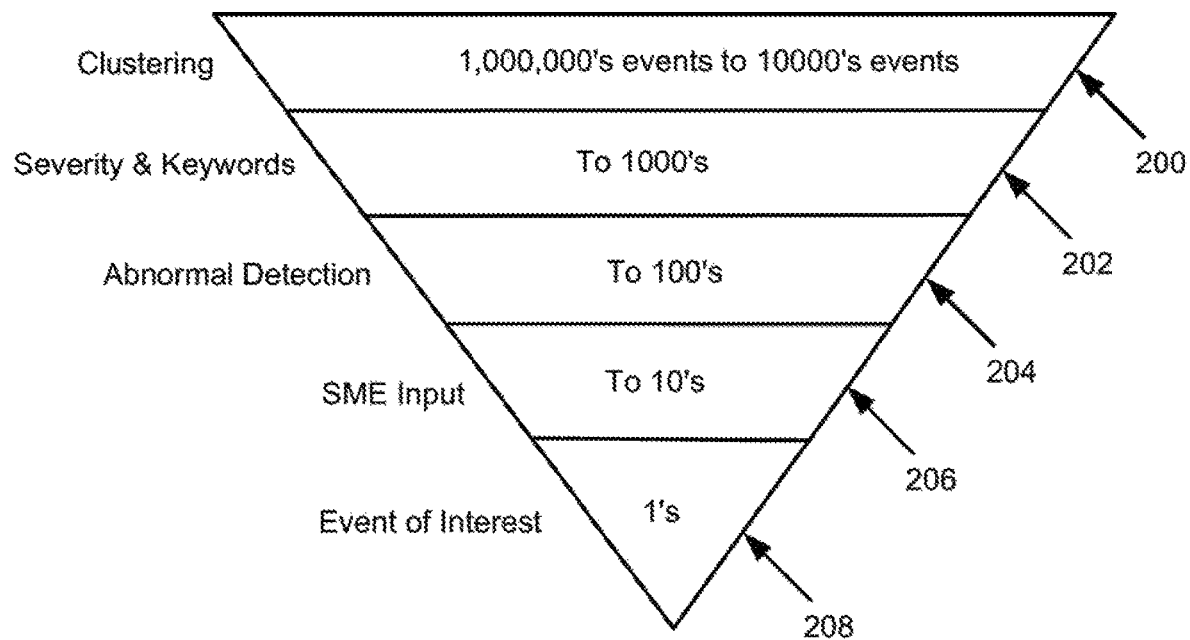
FIG. 2 illustrates event processing hierarchy for the aggregation based event identification apparatus, according to an example of the present disclosure.

According to an example, the number of event types 110 may be several orders of magnitude (e.g., ×100, ×1000, etc.) smaller than a number of the source events 104. For example, FIG. 2 illustrates event processing hierarchy for the apparatus 100, according to an example of the present disclosure. Referring to FIG. 2, according to an example with respect to clustering, as shown at 200, the number of source events 104 may be reduced from 1,000,000's to 10,000's.

Referring to FIG. 1, as described herein, the apparatus 100 may use the event types 110 to aggregate each of the plurality of source events 104 by the event type of the event types 110 and a host of a source event of the plurality of source events 104 (or a different variable) to generate a reduced number of the source events 114, and analyze, for each of the reduced number of the source events 114, a priority characteristic, an abnormal behavior characteristic, and/or a tagged characteristic. The prioritization, abnormal behavior identification, and/or tagging may be implemented for a specified time period (e.g., n days, m hours, etc.).

With respect to the prioritization of the reduced number of the source events 114, the event weighting module 116 may assign a severity to each of the reduced number of the source events 114. The severity may be partitioned, for example, on a scale of 1-100, where different levels of severity may represent different weights (e.g., a low seventy on the scale of 1-100 may represent a weight of 10, a medium seventy on the scale of 1-100 may represent a weight of 40, etc.).

The event weighting module 116 may also use keywords to prioritize each of the reduced number of the source events 114. For example, the keywords may be specific to a type of the source system 106 that generates the source events 104. The keywords may be weighted, for example, on a scale of 1-100. Based on a determination that a keyword is located in one of the reduced number of the source events 114, the weight of the keyword may be used by the event issue, aggregation module 118 to determine the priority characteristic weight, and thus the aggregated event issue weight 120 for each of the reduced number of the source events 114. The severity and keywords associated with the source events 104 may be pre-set, or user configurable.

A user (e.g., a SME) may also add keywords for prioritization of the reduced number of the source events 114. Further, the user may also assign weights to the keywords, where a weight of the keyword may be used by the event issue aggregation module 118 to determine the aggregated event issue weight 120 for each of the reduced number of the source events 114.

Referring to FIG. 2, according to an example with respect to prioritization of each of the reduced number of the source events 114 (e.g., using keywords and severity), as shown at 202, the number of the source events 104 may be reduced from 10,000's to 1000's.

Referring to FIG. 1, with respect to abnormal behavior identification, using a scheduled task, the event weighting module 116 may periodically determine an abnormal behavior characteristic by evaluating a baseline behavior related to an associated one of the reduced number of the source events 114, and determine whether a behavior of the associated one of the reduced number of the source events 114 deviates from the baseline behavior. For example, the event weighting module 116 may use a Gamma distribution to learn normal (i.e., baseline) distribution parameters related to an associated one of the reduced number of the source events 114 over a predetermined time period (e.g., the past 31 days). The predetermined time period may be user configurable. The event weighting module 116 may compare a current distribution of the associated one of the reduced number of the source events 114 (e.g., a current distribution determined over a time period of 5 minutes) to determine if the current distribution deviates from normal behavior (i.e., deviates from the normal distribution parameters related to the associated one of the reduced number of the source events 114).

With respect to the baseline behavior related to the associated one of the reduced number of the source events 114, the baseline behavior may be used to detect the behavior or distribution, for example, of a cluster for a specified time frame. Once the cluster behavior is known, the cluster may be classified as normal or abnormal. The baseline may be used to identify clusters that behave abnormally within a specified time frame, to thus increase a relevance of an event issue related to that cluster or decrease the relevance of the event issue if the cluster is noise (e.g., the cluster behaves in a constant manner throughout the specified time frame).

A cluster may be distributed as a Gamma distribution. In this regard, estimating the scale and rate of the distribution may be performed by evaluating the cluster frequency over a period of time in constant time slices (e.g., buckets). The known cluster frequency may be input into a Gamma maximum likelihood estimation (MLE) function, and scale and rate values (i.e., $\alpha$ and $\beta$ respectively) may be retrieved. Using the MLE, a cluster behavior may be plotted, and a determination may be made as to whether at a certain time period the number of times the cluster has appeared is abnormally high.

With respect to clusters, some clusters may not include a distribution due to insufficient data. For example, a cluster may appear once in a specified time frame (e.g., one value in a data set), or two times in each bucket. In order to determine a distribution of a cluster, at least two unique frequency values in the buckets of the cluster may be needed. A one time value may represent an anomaly, and thus a value of relevance because of its uniqueness throughout the specified time frame. In the case of a fixed value over all the buckets, such a distribution may represent noise.

The Gamma distribution (i.e., $\alpha$ and $\beta$) may be saved for each specified time frame, with the cluster ID of the user/tenant/application, so that a baseline in the context of the same run may be used for each user, or the baseline for the application type may be used for different users. In order to avoid the cost of deleting "previous" baseline determinations, rows with the creation date of the distribution may be added to the baseline determination, where the rows with the creation date may be used to evaluate changes in a cluster over time.

The NILE (and cumulative distribution function (CDF)) evaluations may be performed, for example, by using the R language, where the R language represents a language and environment for statistical computing and graphics, and includes libraries and functions to facilitating statistical analysis. The MLE analysis may be partitioned over the cluster ID, where each data set for each cluster may be determined (and saved) on the node that includes that frequency data for the cluster without the need to move the data between different servers.

Based on the distribution definition, the anomalies in the buckets may be identified. In order to identify anomalies in a cluster within a specified time frame, the buckets may be analyzed by using the CDF of the Gamma distribution that is determined for each cluster. According to an example, some or all of the clusters for which 1-CDF is less than 0.01 may be identified as anomalies to the distribution.

With respect to the abnormal behavior characteristic weight, a determination may be made as to whether an event issue is for a cluster that has an anomaly, and whether the cause somewhat overlaps the anomaly bucket time range. If the event issue is for a cluster that has an anomaly, the abnormal behavior characteristic weight may be increased, and otherwise, the abnormal behavior characteristic weight may be decreased as the cluster may be considered to be noise. Fixed cluster behavior may also be considered as noise, and unique cluster appearance may be considered as anomalies.

According to an example, if a cluster includes the following frequencies: 4, 2, 1, 4, 2 and 1, from the MLE, the $\alpha$ and $\beta$ may be determined as 3.40121 and 1.45766. The probability density function (PDF) and 1-CDF of the duster may be plotted, and from the PDF, it may be determined that a majority of the values range between 1 and 3. If the duster appeared 7 or more times in a time slice bucket, the result of 1-CDF would be below a threshold of 0.01, and may be designated as an anomaly. If an event issue cause from that cluster is valid within that bucket, that event issue cause may be considered as more relevant than other event issue causes, and more likely to be a relevant issue.

Further, with respect to the abnormal behavior characteristic weight, a degree of the deviation of the current distribution of the associated one of the reduced number of the source events 114 from the normal distribution parameters for the associated one of the reduced number of the source events 114 may also be weighted. Thus, the aggregated event issue weight 120 may account for prioritization (i.e., the priority characteristic weight, and further include a score based on the weight (i.e., the abnormal behavior characteristic weight) associated with the degree of the deviation of the current distribution of the associated one of the reduced number of the source events 114 from the normal distribution parameters for the associated one of the reduced number of the source events 114.

Referring to FIG. 2, according to an example with respect to abnormal behavior characteristic weight, as shown at 204, the number of the source events 104 may be reduced from 1000's to 100's.

Referring to FIG. 1, with respect to tagging of the reduced number of the source events 114 for highlighting or suppression (e.g., to indicate an event as being relevant or non-relevant), the event weighting module 116 may present a user of the apparatus 100 with events that are consider of high priority With respect to the high priority events that are presented, the user (e.g., a SME) may have the option to "like" (e.g., escalate to indicate relevancy) an event (e.g., by selecting a "thumbs up" option) or suppress an event (e.g., by selecting a "no entry" option to indicate non-relevancy). The user may also have an option to use a sliding scale to incrementally increase or decrease a priority associated with an event type. The event weighting module 116 may add a crowd wisdom parameter to the tagged characteristic weight for each of the reduced number of the source events 114

(e.g., positive for like and negative for suppress), and use the crowd wisdom parameter when next determining the tagged characteristic weight for each of the reduced number of the source events 114. Thus, the event weighting module 116 may provide for teaching by a user with respect to an event priority.

Referring to FIG. 2, according to an example with respect to tagging of the events (e.g., by an SME), as shown at 206, the number of the source events 104 may be reduced from 100's to 10's.

Referring to FIG. 1, the event identification module 122 may determine whether the aggregated event issue weight 120 for each of the reduced number of the source events 114 exceeds an aggregated event issue weight threshold. Further, in response to a determination that the aggregated event issue weight 120 for each of the reduced number of the source events 114 exceeds the aggregated event issue weight threshold, the event identification module 122 may identify an associated one of the reduced number of the source events 114 for which the aggregated event issue weight 120 exceeds the aggregated event issue weight threshold as an event of interest of a plurality of identified events 124 that may be identified.

Referring to FIG. 2, according to an example, as shown at 208, as described herein with reference to the event issue aggregation module 118 and the event identification module 122, the number of the source events 104 may be reduced from 10's to 1's, for example, to identify the event of interest of the plurality of identified events 124.

Figure 3:
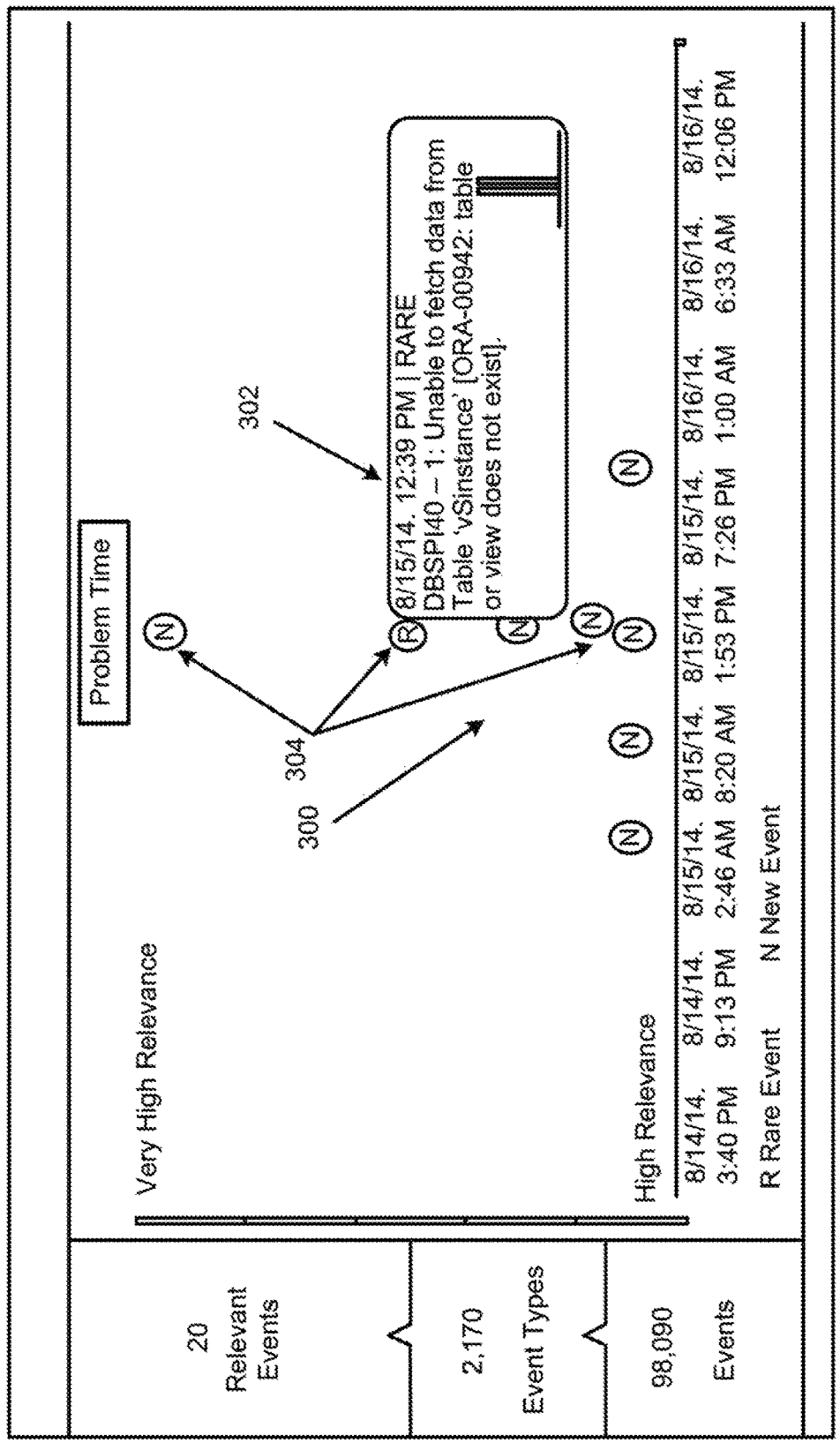
FIG. 3 illustrates results presentation related to the aggregation based event identification apparatus, according to an example of the present disclosure.

FIG. 3 illustrates results presentation related to the apparatus 100, according to an example of the present disclosure. Referring to FIG. 3, a user may be presented with a view that filters the highest priority events out of potentially hundreds of thousands of events in a given time window, thus providing for the user to focus on relevant events while ignoring benign events. For the example of FIG. 3, the relevant events may be graphically illustrated at 300, with the relevance of the events as determined by the aggregated event issue weight 120 being illustrated on a scale from "high relevance" to "very high relevance". The relevant events may also be illustrated, for example, as new events, rare events, etc. A user may select a displayed event and receive further details related to the event at 302.

Referring to FIGS. 1 and 3, with respect to time proximity analysis, the time proximity weighting module 128 may provide for the interactive changing of the relevance of events (e.g., the displayed events). For example, when a time related to an issue is known, the time proximity weighting module 128 may identify specific events that may be the cause of the issue. For example, referring to FIG. 3, if an issue occurred, on Aug. 15, 2014 at 1:53 PM, the time proximity weighting module 128 may identify the events at 304 (e.g., by highlighting the events at 304) that may be the cause of the issue.

Figure 4:
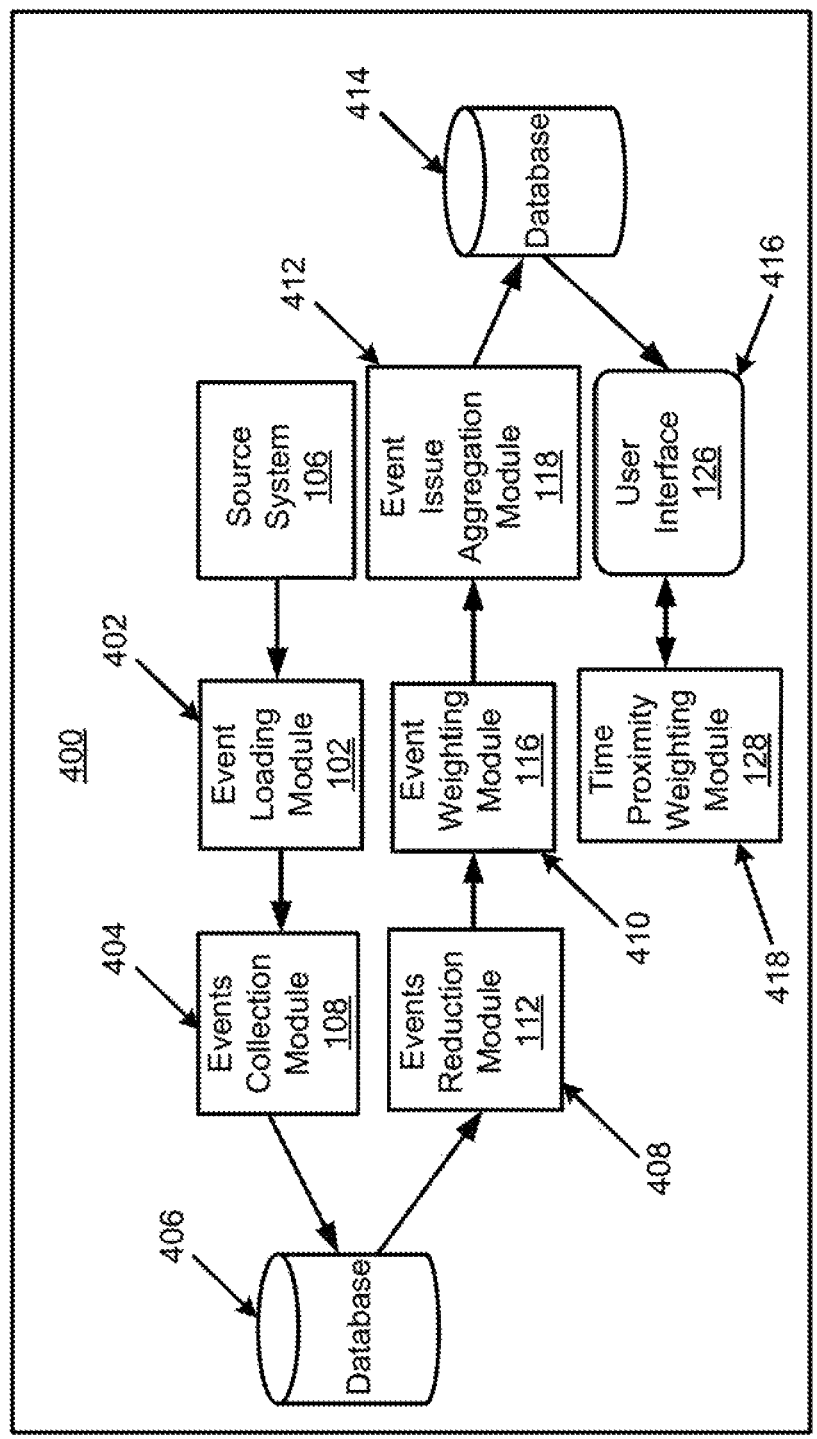
FIG. 4 illustrates data flow related to the aggregation based event identification apparatus, according to an example of the present disclosure.

FIG. 4 illustrates data flow 400 related to the apparatus 100, according to an example of the present disclosure.

Referring to FIGS. 1 and 4, at block 402, the source events 104 may be retrieved from the source system 106 by the event loading module 102. For example, the source events 104 may be pulled by the event loading module 102, based on a definition of fields and mappings between the event loading module 102 and the source system 106. The event loading module 102 may transform the data of the source events 104, for example, from a database (DB) query structure to a common structure used by the events collection module 108 at block 404 (e.g., in .csv (comma separated values) format).

At block 404, the loaded source events 104 may be collected and stored in a database at 406. The events collection module 108 at block 404 may classify the message field of all of the source events 104, where the events collection module 108 may cluster the source events 104 by event types 110 with a similar pattern by identifying which part of each of the source events 104 is fixed and which part represents a parameter.

At block 406, the data from the events collection module 108 may be stored in the database in a plurality of tables.

At block 408, the events reduction module 112 may group each of the source events 104 into buckets of predetermined time intervals (e.g., 5 minutes). The events reduction module 112 may also aggregate the source events 104 by cluster ID and host, assuming that events of the same type and host, indicate the same root issue.

At block 410, the event weighting module 116 may analyze the reduced number of the source events 114 from the events reduction module 112 to attach priority to the reduced number of the source events 114, identify an abnormal behavior of the reduced number of the source events 114, and provide for the tagging of the reduced number of the source events 114 for highlighting or suppression. In this regard, the event weighting module 116 may use a plurality of event evaluators and associated weights. An event evaluator may represent an evaluation of a specific characteristic of an event (e.g., one of the reduced number of the source events 114). The event evaluator may include evaluations related to priority, which includes severity and keyword, abnormal behavior, and tagging (e.g., by a SME). If a specific characteristic of an event falls within a specified range, an event issue (e.g., a problem) may be generated, and a weight may be determined for that event issue. Every event evaluator may generate an event issue even from the same event message, and each event issue may be assigned a different weight.

At block 412, the event issue aggregation module 118 may aggregate one of the weights (if one of the priority characteristic, abnormal behavior characteristic, and tagged characteristic is analyzed) or each of the weights (if two or more of the priority characteristic, abnormal behavior characteristic, and tagged characteristic are analyzed) for each of the reduced number of the source events 114 to determine the aggregated event issue weight 120 for each of the reduced number of the source events 114. The weighted reduced number of the source events 114 may be aggregated to rank those reduced number of the source events 114 that fall in several different categories. For example, the categories may be based on events that include keywords but also have a high severity, events that are rare, events that are marked as noise or marked as an events with highest priority based on the tagging of the events, etc.

At block 414, the aggregated event issue weights 120 (and associated data) for each of the reduced number of the source events 114 that have greater than zero event issues may be stored in the database.

At block 416, selected ones of the reduced number of the source events 114 may be presented as shown on the user interface 126 in the example of the results presentation of FIG. 3.

At block 418, with respect to time proximity analysis, the time proximity weighting module 128 may provide for the interactive changing of the relevance of events (e.g., the displayed events from the reduced number of the source events 114). For example, when a time related to an event issue is known, the time proximity weighting module 128 may identify specific events that may be the cause of the event issue.

FIG. 5 illustrates event distribution over time related to the apparatus 100, according to an example of the present disclosure.

Referring to FIG. 5, once a specific event is identified (e.g., as one of the identified events 124) at 500, a user may view the context of similar or time correlated events at 502. For example, a list of events of the specific identified event 500 may be displayed at 502. At 504, the complete text of the identified event may be displayed with parameters highlighted, for example, by an underline. As described herein, the parameters may be identified by the events collection module 108. At 506, a chart, such as a pie chart, may be provided to illustrate a distribution of unique values of the parameter in focus over all instances of the event in a current time window.

Figure 6:
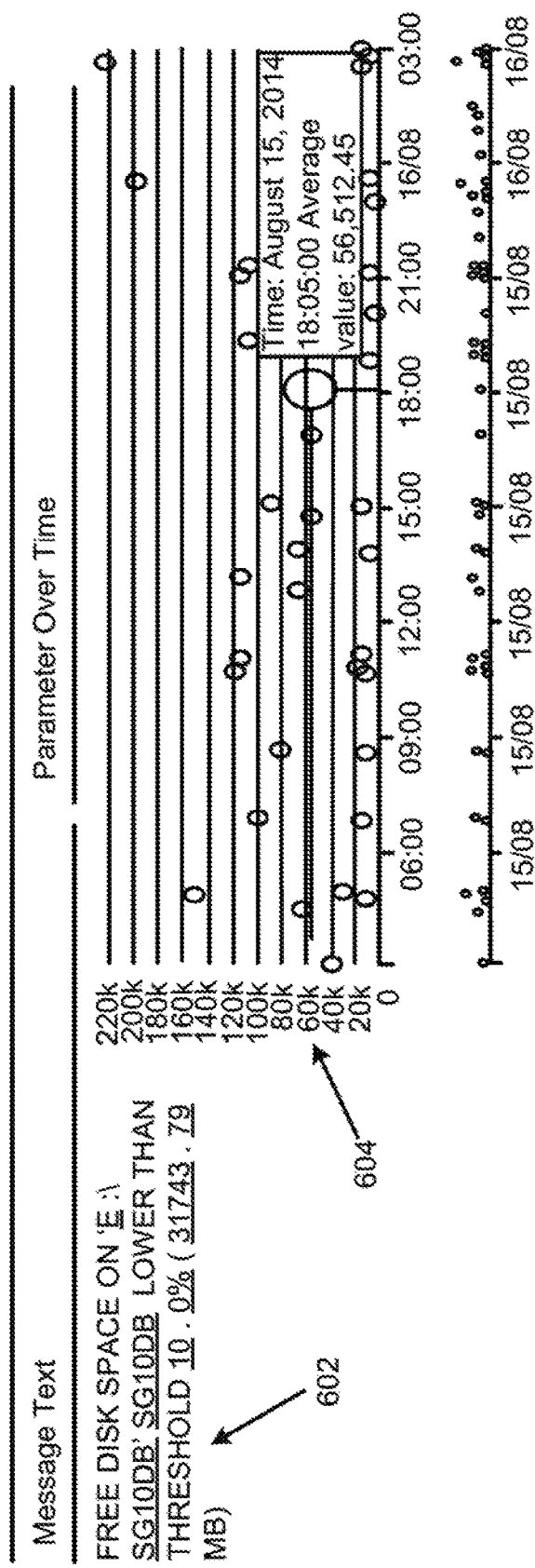
FIG. 6 illustrates event parameter values over time related to the aggregation based event identification apparatus, according to an example of the present disclosure.

FIG. 6 illustrates event parameter values over time related to the apparatus 100, according to an example of the present disclosure.

Referring to FIG. 6, events may include numeric data that may be represented over time. For such events that include numeric data as shown at 600 (e.g., a storage threshold crossed), the full text of the event instance may be displayed at 602. An over time chart of different parameter values of the same event may be displayed at 604 to facilitate identification of trends of storage needs.

Figure 7:
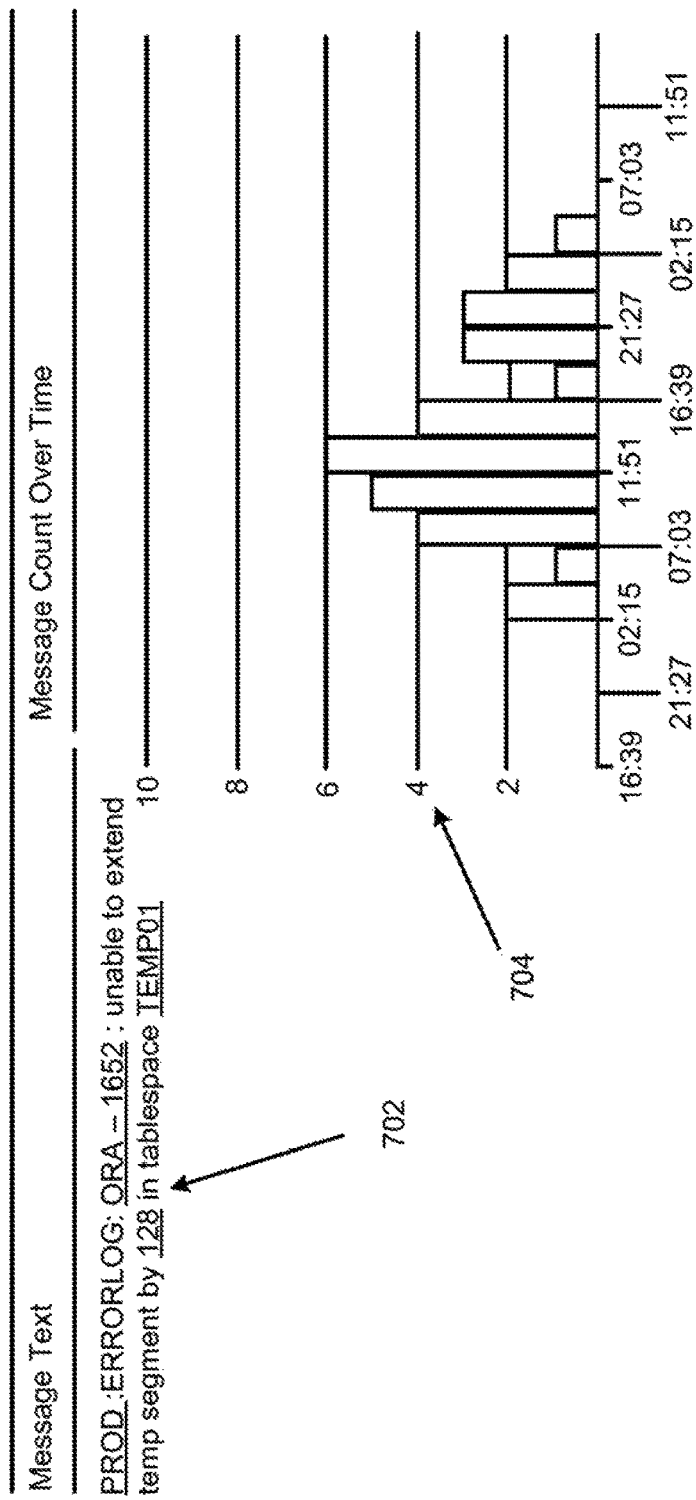
FIG. 7 illustrates event occurrences over time related to the aggregation based event identification apparatus, according to an example of the present disclosure.

FIG. 7 illustrates event occurrences over time related to the apparatus 100, according to an example of the present disclosure.

Referring to FIG. 7, event occurrences over time may be displayed at 700, with the full text of the event instance being displayed at 702. An over time chart of different occurrences of the same event may be displayed at 704 to facilitate identification of relevant trends. At 706, a user may tag each event type with a like or suppress option as described herein with reference to the event weighting module 116.

Referring to FIGS. 5-7, by selecting an event (e.g., by clicking on a displayed event), a user may thus visualize a display of an over time chart on an event, distribution of certain parameters (e.g., which databases, host, or storage tend to fault), an over time chart of the amount of storage extension a system was unable to provide on runtime, etc.

In some examples, the modules and other elements of the apparatus 100 may be machine readable instructions stored on a non-transitory computer readable medium. In this regard, the apparatus 100 may include or be a non-transitory computer readable medium. In some examples, the modules and other elements of the apparatus 100 may be hardware or a combination of machine readable instructions and hardware.

FIGS. 8A-8I illustrate an application of the apparatus 100, according to an example of the present disclosure.

Referring to FIGS. 1, 4, and 8A, the source system 106 may generate a plurality of the source events 104 and/or receive a plurality of the source events 104 from different source messages and/or systems. Referring to FIG. 8A, List-1 includes examples of the source events 104, numbered as source events 1-12.

Referring to FIGS. 1, 4, and 8B, at block 402, the source events 104 may be retrieved from the source system 106 by the event loading module 102. The event loading module 102 may transform the data of the source events 104, for example, from a DB query structure to a common structure used by the events collection module 108 at block 404 (e.g., in .csv (comma separated values) format). Referring to FIG. 8B, List-2 includes an example of the common structure for event number 11 of FIG. 8A (List-1).

Referring to FIGS. 1, 4, and 8C, at block 404, the loaded source events 104 may be collected and stored in the database at 406. The events collection module 108 at block 404 may classify the message field of all of the source events 104, where the events collection module 108 may cluster the source events 104 by event types 110 with a similar pattern by identifying which part of each of the source events 104 is fixed and which part represents a parameter. For the example of FIG. 8A, referring to FIG. 8C, the source events 104 may be partitioned into three event types 110. For event type-I, the parameters may include "GG 643747" and "DB7", for event type-II, the parameters may include "/opt/vertica" and "85", and for event type-III, the parameter may include "51.35", with the remaining text for event types I-III representing the message body.

Referring to FIGS. 1, 4, and 8D, at block 406, the data from the events collection module 108 may be stored in the database in a plurality of tables as shown in List-4 of FIG. 8D.

Referring to FIGS. 1, 4, and 8E, at block 408, the events reduction module 112 may group each of the source events 104 into buckets of predetermined time intervals (e.g., 5 minutes) For the example of List-1 of FIG. 8A, for timestamps from Apr. 11, 2015 22:00:10 to Apr. 11, 2015 22:09:12, the events reduction module 112 may group, each of the source events 104 into two buckets of 5 minutes. The events reduction module 112 may also aggregate the source events 104 by duster ID and host, assuming that events of the same type and host, indicate the same root issue. After this reduction by the events reduction module 112 to generate a reduced number of the source events 114, for the example of FIG. 8A, referring to List-5 of FIG. 8E, the source events 104 may be reduced from 12 events to 8 events (i.e., a 33% reduction). The events after reduction by the events reduction module 112 may be designated as events 101-108.

Referring to FIGS. 1, 4, and 8F, at block 410, the event weighting module 116 may analyze the reduced number of the source events 114 from the events reduction module 112 to attach priority to the reduced number of the source events 114, identify an abnormal behavior of the reduced number of the source events 114, and provide for the tagging of the reduced number of the source events 114 for highlighting or suppression. In this regard, the event weighting module 116 may use a plurality of event evaluators and associated weights. Referring to List-6 of FIG. 8F, the event evaluators, which include evaluations related to priority, which includes severity and keyword, abnormal behavior (i.e., anomaly), and tagging (e.g., by a SME) are listed.

With respect to the example of FIG. 8A, the event evaluators which include evaluations related to priority which includes severity and keyword may include a severity related to "error" and an assigned weight of 100. The event evaluators which further include evaluations related to priority which includes severity and keyword may include the keywords "failure" and "unresponsive", and assigned weights of 50. The event evaluators which further include evaluations related to abnormal behavior (i.e., anomaly) may include a baseline for data of event type II, which may include no more than one event every 5 minutes, and include an assigned weight of 1000. The event evaluators which further include evaluations related to tagging (e.g., by a SME) may be tagged for event type II as being relevant, and include an assigned weight of 60.

Figure 8G:

Referring to FIGS. 1, 4, and 8G, for the example of FIG. 8A, the reduced number of the source events 114 are listed at 800, and associated number of event issues for each of the reduced number of the source events 114 are listed at 802.

Referring to FIGS. 1, 4, and 8G, at block 412, with respect to the event issue aggregation module 118, FIG. 8G illustrates a list of known event issues, each one of a specific type, from all of the events (e.g., the reduced number of the source events 114) where the event evaluators determine event issues. Referring to the number of event issues listed at 802, certain events of the reduced number of the source events 114 (e.g., the reduced number of the source events 114 101) may include greater than one event issue, for example, because such events fall in more than one event evaluator analysis category. For the example of FIG. 8A, with respect to the keyword "unresponsive", "error" level being considered with high relevance, detection of an anomaly for a baseline for data of event type II, which may include no more than one event every 5 minutes, and tagging for event type II as relevant, the event issue aggregation module 118 may determine aggregated event issues based on each of the event issues for each of the reduced number of the events. For example, referring to FIG. 8H, events related to the reduced number of the source events 114 designated as 101 in FIG. 8G are listed in FIG. 8H, and include event numbers 1, 2, 3, and 5 of FIG. 8A.

Referring to FIGS. 1, 4, and 8I, with respect to the event issue aggregation module 118, the event issue aggregation module 118 may aggregate the weights of each of the event issues for each of the reduced number of the source events 114 to generate aggregated event issue weights 120. For example, as shown in FIG. 8I, for the example of FIG. 8A, the aggregated event issue weights 120 may include an aggregated event issue weight 120 of 1210 for the event, designated as 1113, where the event designated as 1113 may include event numbers 1, 2, 3, and 5 from FIG. 8A, and correspond to the reduced number of the source events 114 designated as 101 in FIG. 8G.

Referring to FIGS. 1, 4, and 8A-8I, at block 414, the aggregated event issue weights 120 (and associated data) for each of the reduced number of the source events 114 that have greater than zero event issues may be stored in the database. For the example of FIGS. 8A and 8I, the aggregated event issue weights 120 (and associated data) for the reduced number of the source events 114 designated 1113-1117 may be stored in the database. Each of aggregated event issue weights 120 may include all events aggregated for a predetermined time period (e.g., 5 minutes in the example of FIGS. 8A-8I), where the aggregation may be performed, for example, by host and type (cluster_ID), by event evaluator. If there are events that fall on several or all of the event evaluators from the same event type and host, an aggregated event issue may also be generated and stored in the database at block 414, for example, with the associated event issue weights aggregated.

Referring to FIGS. 1, 4, and 8A-8I, at block 416, selected ones of the reduced number of the source events 114 may be presented as shown on the user interface 126 in the example of the results presentation of FIG. 3. For example, the reduced number of the source events 114 that include an aggregated event issue weight 120 that exceeds a predetermined aggregated event issue weight threshold may be presented as shown in the example of the results presentation of FIG. 3. For the example of FIGS. 8A and 8I, assuming that the predetermined aggregated event issue weight threshold is 1000, the reduced number of the source events 114 designated 1113 may be presented as shown in the example of the results presentation of FIG. 3.

Referring to FIGS. 1, 4, and 8A-8I, at block 418, with respect to time proximity analysis, as disclosed herein, the time proximity weighting module 128 may provide for the interactive changing of the relevance of events (e.g., the displayed events from the reduced number of the source events 114). For example, when a time related to an event issue is known, the time proximity weighting module 128 may identify specific events that may be the cause of the event issue.

Figure 10:
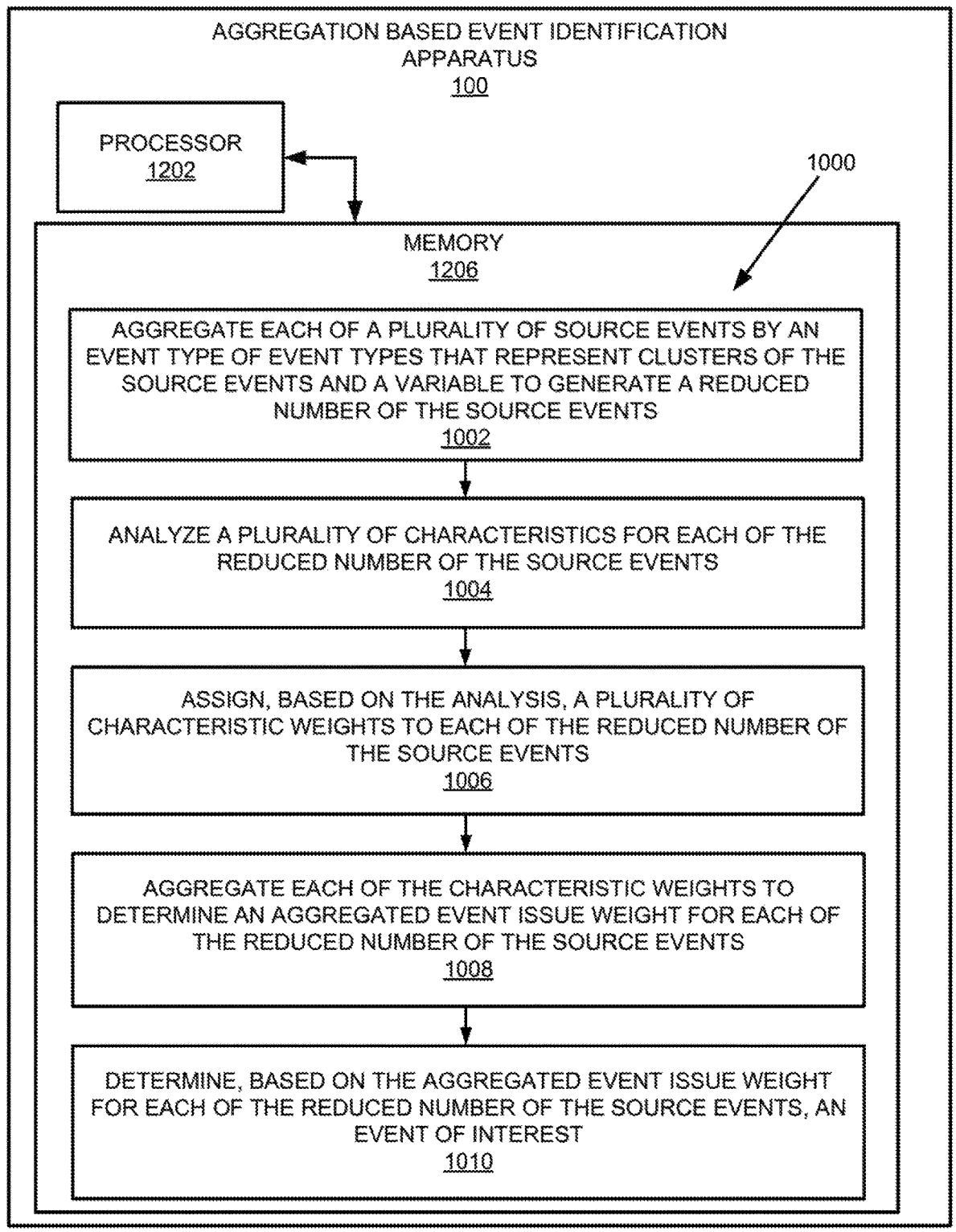
FIG. 10 illustrates a method for aggregation based event identification, according to an example of the present disclosure.
Figure 11:
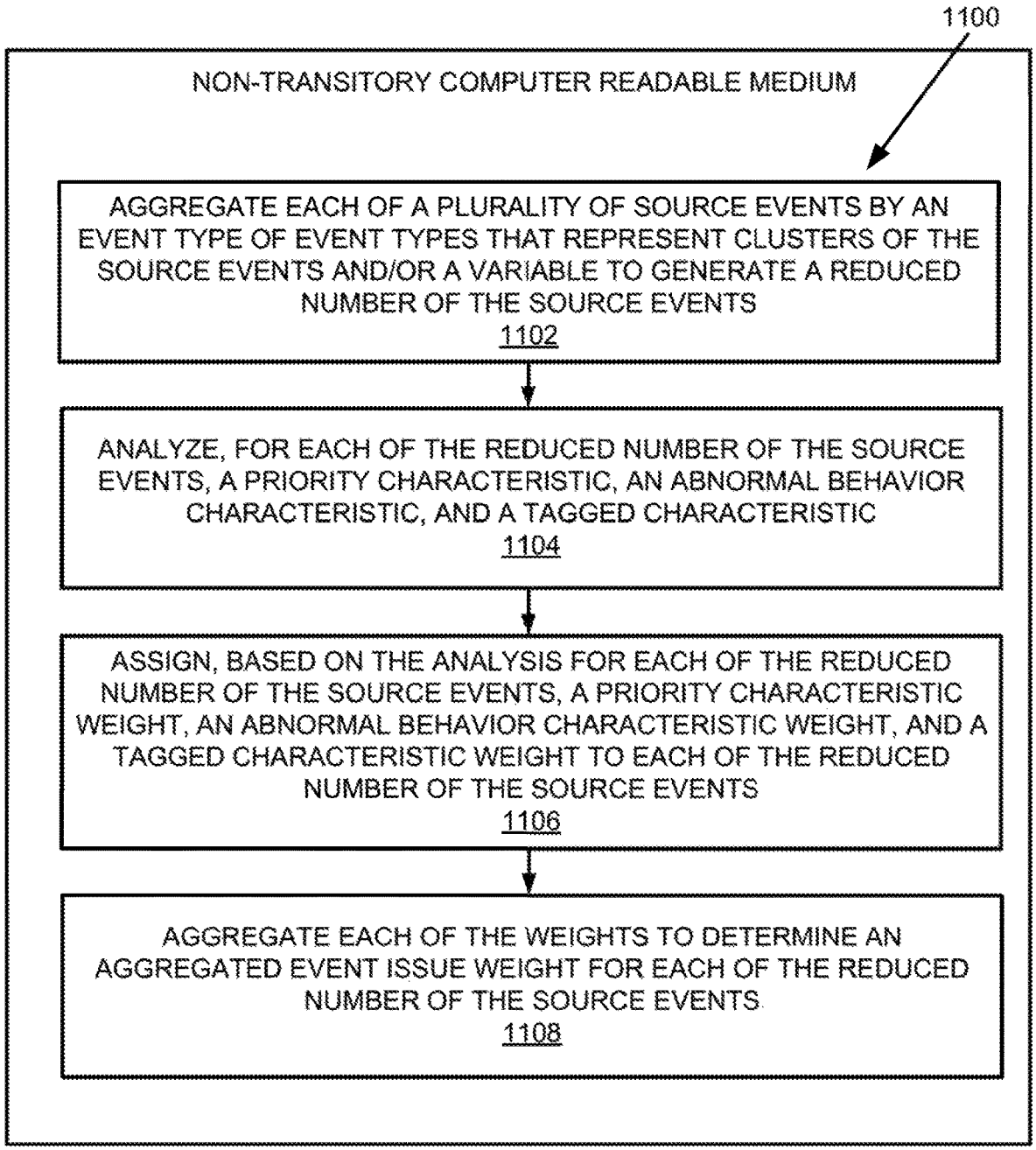
FIG. 11 illustrates a method for aggregation based event identification, according to an example of the present disclosure.

FIGS. 9-11 respectively illustrate flowcharts of methods 900, 1000, and 1100 for aggregation based event identification, corresponding to the example of the aggregation based event identification apparatus 100 whose construction is described in detail above. The methods 900, 1000, and 1100 may be implemented on the aggregation based event identification apparatus 100 with reference to FIGS. 1-8I and 12 by way of example and not limitation. The methods 900, 1000, and 1100 may be practiced in other apparatus.

Referring to FIG. 9, for the method 900, at block 902, the method may include aggregating each of a plurality of source events by an event type of event types that represent clusters of the source events and/or a host of a source event of the source events to generate a reduced number of the source events. For example, referring to FIG. 1, the events reduction module 112 may aggregate each of a plurality of source events 104 by an event type of event types 110 that represent clusters of the source events 104 and/or a host of a source event of the source events 104 (or a different variable) to generate a reduced number of the source events 114.

At block 904, the method may include analyzing a characteristic for each of the reduced number of the source events. For example, referring to FIG. 1, the event weighting module 116 may analyze a characteristic for each of the reduced number of the source events.

At block 906, the method may include assigning, based on the analysis of the characteristic for each of the reduced number of the source events, a characteristic weight to each of the reduced number of the source events. For example, referring to FIG. 1, the event, weighting module 116 may assign, based on the analysis of the characteristic for each of the reduced number of the source events 114, a characteristic weight to each of the reduced number of the source events 114.

At block 908, the method may include aggregating the characteristic weights for each of the reduced number of the source events to determine an aggregated event issue weight for each of the reduced number of the source events. For example, referring to FIG. 1, the event issue aggregation module 118 may aggregate the characteristic weights for each of the reduced number of the source events 114 to determine an aggregated event issue weight for each of the reduced number of the source events 114.

According to an example, for the method 900, the characteristic may include a priority characteristic, an abnormal behavior characteristic, and/or a tagged characteristic.

According to an example, for the method 900, aggregating each of the plurality of source events 104 by the event type of the event types 110 that represent clusters of the source events and/or the host of the source event of the source events 104 to generate the reduced number of the source events 114 may further include grouping each of the plurality of source events into buckets of predetermined time intervals, and based on the grouping, for each bucket of the buckets, aggregating each of the plurality of source events 104 by the event type of the event types 110 that represent clusters of the source events and/or the host of the source event of the source events 104 to generate the reduced number of the source events 114.

According to an example, for the method 900, the characteristic may include a priority characteristic, and analyzing, the priority characteristic for each of the reduced number of the source events may further include determining the priority characteristic by evaluating a severity related to an associated one of the reduced number of the source events 114, and presence of a keyword in the associated one of the reduced number of the source events 114.

According to an example, for the method 900, the severity related to the associated one of the reduced number of the source events 114 may include a plurality of seventy levels ranging from low severity to high severity.

According to an example, for the method 900, the characteristic may include an abnormal behavior characteristic, and analyzing, the abnormal behavior characteristic for each of the reduced number of the source events may further include determining the abnormal behavior characteristic by evaluating a baseline behavior related to an associated one of the reduced number of the source events 114, and determining whether a behavior of the associated one of the reduced number of the source events 114 deviates from the baseline behavior.

According to an example, for the method 900, the baseline behavior may be based on the event type of the event types 110.

According to an example, for the method 900, the characteristic may include a tagged characteristic, and analyzing, the tagged characteristic for each of the reduced number of the source events may further include determining the tagged characteristic by evaluating whether an associated one of the reduced number of the source events 114 is identified as being relevant or as being non-relevant.

According to an example, the method 900 may further include determining whether the aggregated event issue weight 120 for each of the reduced number of the source events 114 exceeds an aggregated event issue weight threshold, and in response to a determination that the aggregated event issue weight 120 for each of the reduced number of the source events 114 exceeds the aggregated event issue weight threshold, identifying an associated one of the reduced number of the source events 114 for which the aggregated event issue weight 120 exceeds the aggregated event issue weight threshold as an event of interest (e.g., one of the identified events 124).

Referring to FIG. 10, for the method 1000, at block 1002, the method may include aggregating each of a plurality of source events by an event type of event types that represent clusters of the source events and a variable to generate a reduced number of the source events. For example, referring to FIG. 1, the events reduction module 112 may aggregate each of a plurality of source events 104 by an event type of event types 110 that represent clusters of the source events and a variable to generate a reduced number of the source events 114. According to an example, the variable may include different elements such as a source type of an event, a server type of the event, etc. For the example of FIG. 10, the method 1000 may be implemented on the apparatus 100 with reference to FIGS. 1-8I and 12, where a processor 1202 and a memory 1206 are described in further detail with reference to FIG. 12.

At block 1004, the method may include analyzing a plurality of characteristics for each of the reduced number of the source events. For example, referring to FIG. 1, the event weighting module 116 may analyze a plurality of characteristics for each of the reduced number of the source events 114.

At block 1006, the method may include assigning, based on the analysis, a plurality of characteristic weights to each of the reduced number of the source events. For example, referring to FIG. 1, the event weighting module 116 may assign, based on the analysis, a plurality of characteristic weights to each of the reduced number of the source events 114.

At block 1008, the method may include aggregating each of the characteristic weights to determine an aggregated event issue weight for each of the reduced number of the source events. For example, referring to FIG. 1, the event issue aggregation module 118 may aggregate each of the characteristic weights to determine an aggregated event issue weight 120 for each of the reduced number of the source events 114.

At block 1010, the method may include determining, based on the aggregated event issue weight for each of the reduced number of the source events, an event of interest. For example, referring to FIG. 1, the event identification module 122 may determine, based on the aggregated event issue weight for each of the reduced number of the source events, an event of interest (for the identified events 124).

According to an example, the method 1000 may further include receiving an indication of a time related to a different event of interest, and identifying, by the me proximity weighting module 128 events of interest that are a cause of the different event of interest.

According to an example, for the method 1000, a characteristic of the plurality of characteristics may include a priority characteristic, and analyzing the plurality of characteristics for each of the reduced number of the source events may further include receiving a keyword, and determining the priority characteristic by evaluating a severity related to an associated one of the reduced number of the source events, and presence of the received keyword in the associated one of the reduced number of the source events.

Referring to FIG. 11, for the method 1100, at block 1102, the method may include aggregating each of a plurality of source events by an event type of event types that represent clusters of the source events and/or a variable to generate a reduced number of the source events. For example, referring to FIG. 1, the events reduction module 112 may aggregate each of a plurality of source events 104 by an event type of event types 110 that represent clusters of the source events and/or a variable to generate a reduced number of the source events 114. According to an example, the variable may include different elements such as a source type of an event, a server type of the event, etc. For the example of FIG. 11, the method 1100 may be implemented on a non-transitory computer readable medium having stored thereon machine readable instructions to provide aggregation based event identification.

At block 1104, the method may include analyzing, for each of the reduced number of the source events, a priority characteristic, an abnormal behavior characteristic, and a tagged characteristic. For example, referring to FIG. 1, the event weighting module 116 may analyze, for each of the reduced number of the source events 114, a priority characteristic, an abnormal behavior characteristic, and a tagged characteristic.

At block 1106, the method may include assigning, based on the analysis for each of the reduced number of the source events, a priority characteristic weight, an abnormal behavior characteristic weight, and a tagged characteristic weight to each of the reduced number of the source events. For example, referring to FIG. 1, the event weighting module 116 may assign, based on the analysis for each of the reduced number of the source events 114, a priority characteristic weight, an abnormal behavior characteristic weight, and a tagged characteristic weight to each of the reduced number of the source events 114.

At block 1108, the method may include aggregating each of the weights to determine an aggregated event issue weight for each of the reduced number of the source events. For example, referring to FIG. 1, the event issue aggregation module 118 may aggregate each of the weights to determine an aggregated event issue weight 120 for each of the reduced number of the source events 114.

According to an example, for the method 1100, analyzing, for each of the reduced number of the source events 114, the priority characteristic, the abnormal behavior characteristic, and the tagged characteristic, may further include determining the abnormal behavior characteristic by evaluating a baseline behavior related to an associated one of the reduced number of the source events 114 from historic data related to the plurality of the source events 104, and determining whether a behavior of the associated one of the reduced number of the source events 104 deviates from the baseline behavior.

According to an example, the method 1100 may further include determining whether the aggregated event issue weight 120 for each of the reduced number of the source events 114 exceeds an aggregated event issue weight threshold, and in response, to a determination that the aggregated event issue weight 120 for each of the reduced number of the source events 114 exceeds the aggregated event issue weight threshold, identify an associated one of the reduced number of the source events 114 for which the aggregated event issue weight 120 exceeds the aggregated event issue weight threshold as an event of interest (e.g., one of the identified events 124).

Figure 12:
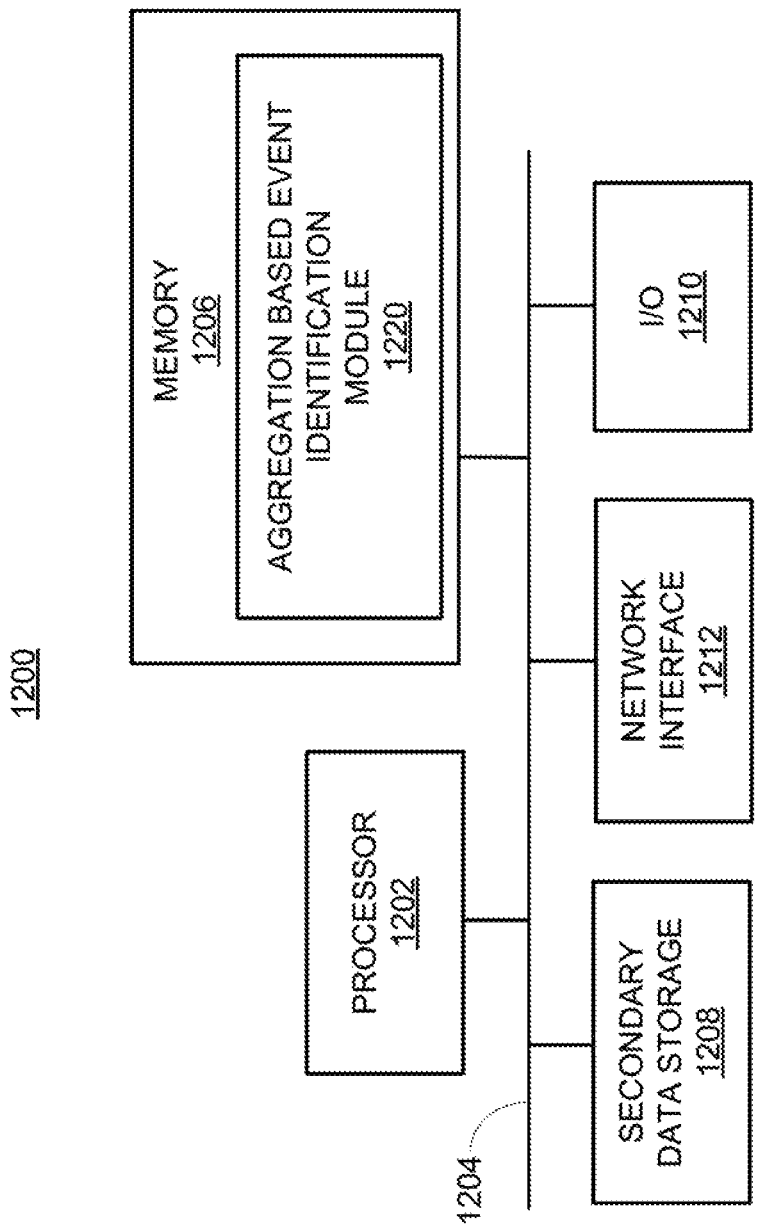
FIG. 12 illustrates a computer system, according to an example of the present disclosure.

FIG. 12 shows a computer system 1200 that may be used with the examples described herein. The computer system 1200 may represent a generic platform that includes components that may be in a server or another computer system. The computer system 1200 may be used as a platform for the apparatus 100. The computer system 1200 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory EPROM (erasable, programmable ROM), EEPROM (electrically erasable, programmable ROM), hard drives, and flash memory).

The computer system 1200 may include the processor 1202 that may implement or execute machine readable instructions performing some or all of the methods, functions and other processes described herein. Commands and data from the processor 1202 may be communicated over a communication bus 1204. The computer system may also include the main memory 1206, such as a random access memory (RAM), where the machine readable instructions and data for the processor 1202 may reside during runtime, and a secondary data storage 1208, which may be non-volatile and stores machine readable instructions and data. The memory and data storage are examples of computer readable mediums. The memory 1206 may include an aggregation based event identification module 1220 including machine readable instructions residing in the memory 1206 during runtime and executed by the processor 1202. The aggregation based event identification module 1220 may include the modules of the apparatus 100 shown in FIG. 1.

The computer system 1200 may include an I/O device 1210, such as a keyboard, a mouse, a display, etc. The computer system may include a network interface 1212 for connecting to a network. Other known electronic components may be added or substituted in the computer system.

What has been described and illustrated herein is an example along with some of its variations. The terms, descriptions and figures used herein are set forth by way of illustration and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method performed by a system comprising a hardware processor, comprising:
   aggregating a plurality of source events by at least one of an event type of event types that represent clusters of the source events or a host of a source event of the source events to generate a reduced number of the source events;
   analyzing a characteristic for each source event of the reduced number of the source events;
   assigning, based on the analyzing of the characteristic for each source event of the reduced number of the source events, characteristic weights to each source event of the reduced number of the source events; and
   aggregating the characteristic weights for each source event of the reduced number of the source events to determine an aggregated event issue weight for each source event of the reduced number of the source events.

2. The method of claim 1, wherein the characteristic includes one or more of:
   a priority characteristic;
   an abnormal behavior characteristic; and
   a tagged characteristic.

3. The method of claim 1, wherein aggregating the plurality of source events by at least one of the event type or the host of the source event to generate the reduced number of the source events comprises:
   grouping the plurality of source events into buckets of predetermined time intervals; and
   based on the grouping, for each respective bucket of the buckets, aggregating source events in the respective bucket by at least one of the event type or the host to generate the reduced number of the source events.

4. The method of claim 1, wherein the characteristic includes a priority characteristic, and analyzing the priority characteristic for each source event of the reduced number of the source events comprises:
   determining the priority characteristic by evaluating
      a severity related to an associated one of the reduced number of the source events, and
      presence of a keyword in the associated one of the reduced number of the source events.

5. The method of claim 4, wherein the severity related to the associated one of the reduced number of the source events includes a plurality of severity levels ranging from low severity to high severity.

6. The method of claim 1, wherein the characteristic includes an abnormal behavior characteristic, and analyzing the abnormal behavior characteristic for each source event of the reduced number of the source events comprises:
   determining the abnormal behavior characteristic by evaluating
      a baseline behavior related to an associated one of the reduced number of the source events, and
      determining whether a behavior of the associated one of the reduced number of the source events deviates from the baseline behavior.

7. The method of claim 6, wherein the baseline behavior is based on the event type of the event types.

8. The method of claim 1, wherein the characteristic includes a tagged characteristic, and analyzing the tagged characteristic for each source event of the reduced number of the source events comprises:
   determining the tagged characteristic by evaluating whether an associated one of the reduced number of the source events is identified as being relevant or as being non-relevant.

9. The method of claim 1, further comprising:
   determining whether the aggregated event issue weight for a given source event of the reduced number of the source events exceeds an aggregated event issue weight threshold; and
   in response to a determination that the aggregated event issue weight for the given source event exceeds the aggregated event issue weight threshold, identifying the given source event for which the aggregated event issue weight exceeds the aggregated event issue weight threshold as an event of interest.

10. The method of claim 1, wherein the aggregating of the plurality of source events comprises aggregating the plurality of source events by the event types and hosts of the source events.

11. The method of claim 1, wherein the assigning of the characteristic weights to a respective source event of the reduced number of the source events comprises:
   assigning a priority characteristic weight to the respective source event, the priority characteristic weight based on weights of keywords in the respective source event, and
   assigning a further characteristic weight to the respective source event, the further characteristic weight different from the priority characteristic weight, and
   wherein the aggregating of the characteristic weights for the respective source event comprises aggregating the priority characteristic weight and the further characteristic weight.

12. The method of claim 11, wherein the further characteristic weight comprises an abnormal behavior characteristic weight assigned to the respective source event based on evaluating the respective source event with respect to a baseline behavior.

13. The method of claim 11, wherein the further characteristic weight comprises a tagged characteristic weight assigned to the respective source event based on a user-input priority assigned to the respective source event.

14. A system comprising:
   a processor; and
   a non-transitory storage medium storing machine readable instructions executable on the processor to:
      aggregate a plurality of source events by an event type of event types that represent clusters of the source events and a variable to generate a reduced number of the source events;
      analyze a plurality of characteristics for each source event of the reduced number of the source events;
      assign, based on the analyzing, a plurality of characteristic weights to each source event of the reduced number of the source events;
      aggregate the plurality of characteristic weights for each source event of the reduced number of the source events to determine an aggregated event issue weight for each source event of the reduced number of the source events; and
      determine, based on the aggregated event issue weight for each source event of the reduced number of the source events, an event of interest.

15. The system of claim 14, wherein a characteristic of the plurality of characteristics includes a priority characteristic, and wherein the machine readable instructions to analyze the plurality of characteristics for each source event of the reduced number of the source events comprise machine readable instructions to:
   receive a keyword; and
   determine the priority characteristic by evaluating:
      a severity related to an associated one of the reduced number of the source events, and
      presence of the received keyword in the associated one of the reduced number of the source events.

16. The system of claim 14, wherein the plurality of characteristic weights assigned to a respective source event of the reduced number of the source events comprise:
   a priority characteristic weight assigned to the respective source event, the priority characteristic weight based on weights of keywords in the respective source event, and
   a further characteristic weight assigned to the respective source event, the further characteristic weight different from the priority characteristic weight,
   wherein the aggregating of the plurality of characteristic weights for the respective source event comprises aggregating the priority characteristic weight and the further characteristic weight.

17. The system of claim 16, wherein the further characteristic weight comprises an abnormal behavior characteristic weight assigned to the respective source event based on evaluating the respective source event with respect to a baseline behavior.

18. The system of claim 16, wherein the further characteristic weight comprises a tagged characteristic weight assigned to the respective source event based on a user-input priority assigned to the respective source event.

19. A non-transitory computer readable medium comprising machine readable instructions that when executed, cause a system to:
   aggregate a plurality of source events by an event type of event types that represent clusters of the source events and a variable to generate a reduced number of the source events;
   analyze, for each source event of the reduced number of the source events, a priority characteristic, an abnormal behavior characteristic, and a tagged characteristic;
   assign, based on the analyzing for each source event of the reduced number of the source events, a priority characteristic weight, an abnormal behavior characteristic weight, and a tagged characteristic weight to each source event of the reduced number of the source events;
   aggregate the priority characteristic weight, the abnormal behavior characteristic weight, and the tagged characteristic weight assigned to each source event of the reduced number of the source events to determine an aggregated event issue weight for each source event of the reduced number of the source events.

* * * * *